United States Patent
Sharma et al.

(10) Patent No.: US 11,468,016 B2
(45) Date of Patent: Oct. 11, 2022

(54) METHOD AND SYSTEM FOR PARALLELIZING BACKUP GENERATION OPERATIONS USING PSEUDO-ASSET BACKUPS

(71) Applicant: EMC IP Holding Company LLC, Hopkinton, MA (US)

(72) Inventors: Manish Sharma, Bangalore (IN); Aaditya Rakesh Bansal, Bangalore (IN); Shelesh Chopra, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/987,604

(22) Filed: Aug. 7, 2020

(65) Prior Publication Data

US 2022/0043775 A1 Feb. 10, 2022

(51) Int. Cl.
*G06F 16/178* (2019.01)
*G06F 16/16* (2019.01)

(52) U.S. Cl.
CPC .......... *G06F 16/178* (2019.01); *G06F 16/164* (2019.01)

(58) Field of Classification Search
CPC ... G06F 11/1461; G06F 16/178; G06F 16/164
See application file for complete search history.

(56) References Cited

U.S. PATENT DOCUMENTS

| | | | |
|---|---|---|---|
| 7,797,284 B1 * | 9/2010 | Chellappa | H04L 69/40 718/107 |
| 8,442,945 B1 | 5/2013 | Doerner | |
| 9,424,136 B1 | 8/2016 | Teater et al. | |
| 9,547,562 B1 * | 1/2017 | Feathergill | G06F 11/1469 |
| 10,127,119 B1 | 11/2018 | Paulzagade et al. | |
| 10,496,827 B1 * | 12/2019 | Ridner | G06Q 10/0635 |
| 11,182,372 B1 * | 11/2021 | Jain | G06F 11/1464 |
| 2011/0161297 A1 | 6/2011 | Parab | |
| 2019/0034295 A1 * | 1/2019 | Bourgeois | G06F 11/1451 |
| 2019/0108099 A1 | 4/2019 | Mazumdar | |
| 2019/0227878 A1 | 7/2019 | Agarwal et al. | |
| 2020/0057669 A1 * | 2/2020 | Hutcheson | G06F 3/0659 |
| 2020/0401489 A1 | 12/2020 | Mitkar et al. | |
| 2021/0064485 A1 | 3/2021 | Rana et al. | |
| 2021/0075768 A1 * | 3/2021 | Polimera | H04L 63/0281 |
| 2022/0043718 A1 | 2/2022 | Sharma et al. | |

* cited by examiner

*Primary Examiner* — Mariela Reyes
*Assistant Examiner* — Courtney Harmon
(74) *Attorney, Agent, or Firm* — Chamberlain, Hrdlicka, White, Williams & Aughtry

(57) ABSTRACT

A method that is performed for backing up data. The method includes obtaining a backup request; and in response to the backup request: obtaining an asset and an asset entry from a file system metadata repository associated with the backup request; identifying asset components of the asset using the asset entry; assigning asset components to backup threads to be backed up as pseudo-assets based on the asset entry; executing the backup threads to generate pseudo-asset backups; storing the pseudo-asset backups on backup storages; and updating asset backup metadata based on the pseudo-asset backups.

11 Claims, 11 Drawing Sheets

METHOD AND SYSTEM FOR PARALLELIZING BACKUP GENERATION OPERATIONS USING PSEUDO-ASSET BACKUPS

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method performed for backing up data. The method includes obtaining a backup request; and in response to the backup request: obtaining an asset and an asset entry from a file system metadata repository associated with the backup request; identifying asset components of the asset using the asset entry; assigning asset components to backup threads to be backed up as pseudo-assets based on the asset entry; executing the backup threads to generate pseudo-asset backups; storing the pseudo-asset backups on backup storages; and updating asset backup metadata based on the pseudo-asset backups.

In general, in one aspect, the invention relates to a system this is used for backing up data. The system includes a processor and a backup agent, which when executed by the processor performs a method. The method includes obtaining a backup request; and in response to the backup request: obtaining an asset and an asset entry from a file system metadata repository associated with the backup request; identifying asset components of the asset using the asset entry; assigning asset components to backup threads to be backed up as pseudo-assets based on the asset entry; executing the backup threads to generate pseudo-asset backups; storing the pseudo-asset backups on backup storages; and updating asset backup metadata based on the pseudo-asset backups.

In general, in one aspect, the invention relates to a non-transitory computer readable medium which includes computer readable program code, which when executed by a computer processor enables the computer processor to perform a method for backing up data. The method includes obtaining a backup request; and in response to the backup request: obtaining an asset and an asset entry from a file system metadata repository associated with the backup request; identifying asset components of the asset using the asset entry; assigning asset components to backup threads to be backed up as pseudo-assets based on the asset entry; executing the backup threads to generate pseudo-asset backups; storing the pseudo-asset backups on backup storages; and updating asset backup metadata based on the pseudo-asset backups.

DETAILED DESCRIPTION

Figure 1A:
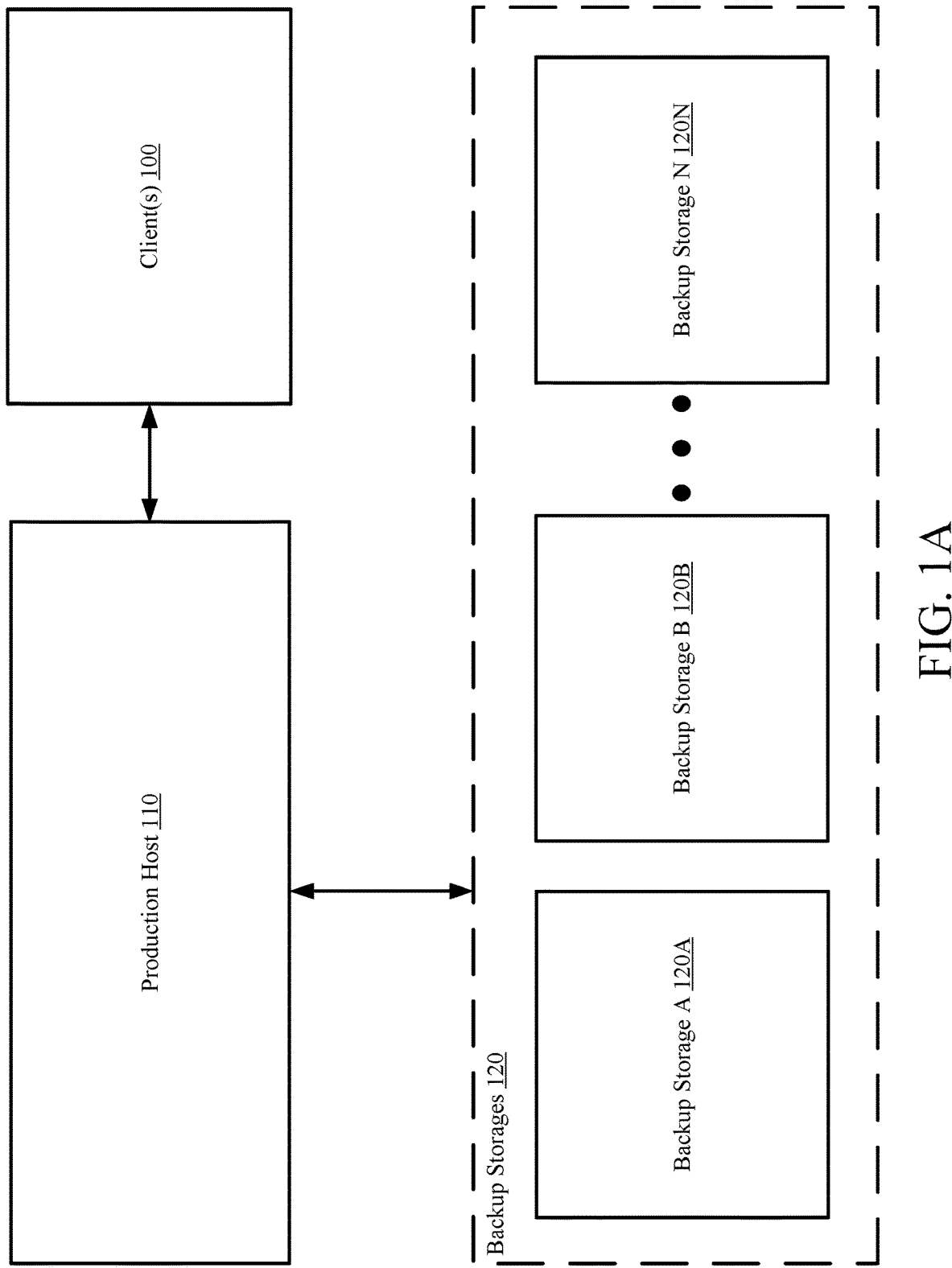
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for backing up data. More specifically, embodiments of the invention relate to generating asset backups by assigning asset components to separate backup threads. An asset may be assigned and divided to separate backup threads in any logical way. The division of asset components to separate threads allows for the files to be assigned to separate threads and not only folders. The execution of the backup threads results in the generation of pseudo-assets and the pseudo-assets which are backed up as pseudo-asset backups and are later merged together to generate a single asset backup stored in backup storages. The division of assets into separate backup threads allows for the parallelization of the asset backup operation and may improve the efficiency of generating backups of assets as opposed to generating asset backups in a sequential manner.

FIG. 1A shows a diagram of a system in accordance with one or more embodiments of the invention. The system may include client(s) (100), a production host (110), and backup storages (120). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) provides services to the client(s) (100) and generates and provides pseudo-asset backups to the backup storages (120). The production host (110) may also initiate the merging of pseudo-asset backups with other pseudo-asset backups or other asset backups to generate asset backups. The production host (110) may include other and/or additional functionality without departing from the invention. For additional information regarding the production host, refer to e.g., FIG. 1B.

Figure 5:
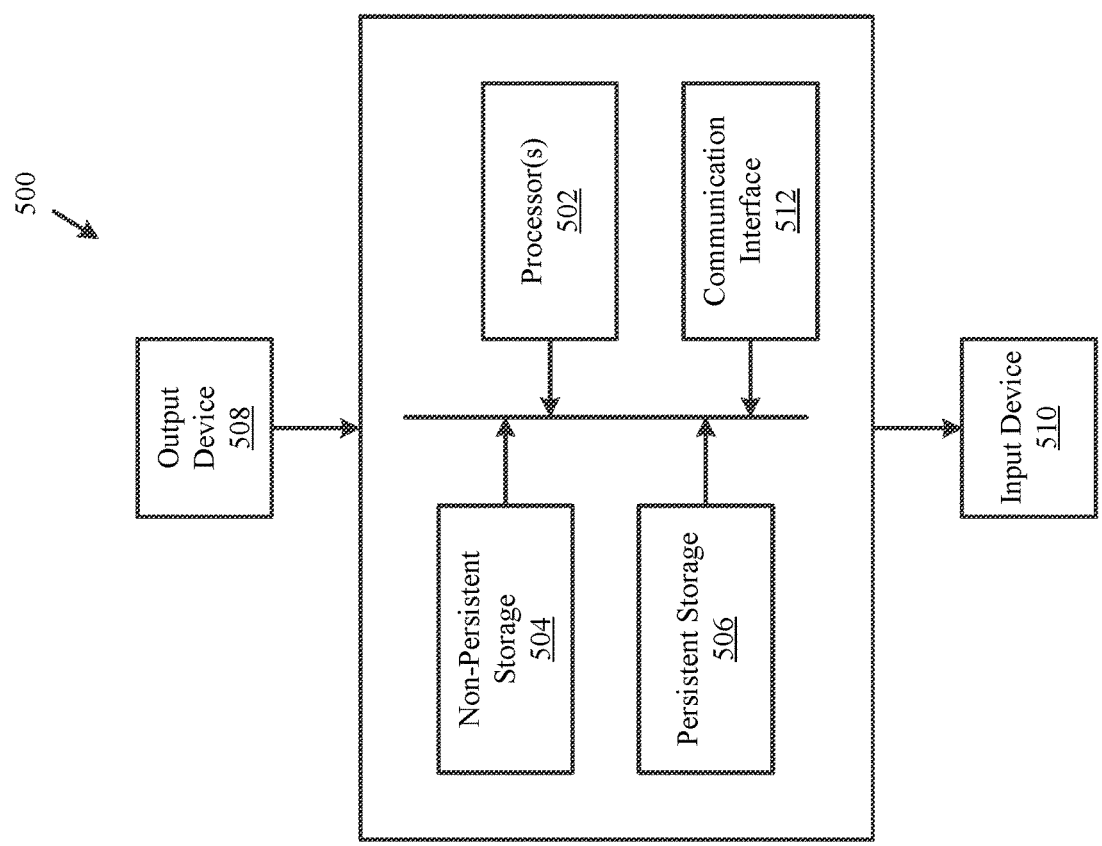
FIG. 5 shows a diagram of a computing device in accordance with one or more embodiments of the invention.

In one or more embodiments of the invention, the production host (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the client(s) (100) utilize services provided by the production host (110). Specifically, the client(s) (100) may utilize the applications (see e.g., FIG. 1B) hosted by the production host (110) to obtain, modify, and/or store data. The data may be generated from applications hosted in the production host (110).

In one or more embodiments of the invention, a client(s) (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storages (120) include the functionality to store backups of assets and pseudo-assets of the file system using pseudo-asset backups obtained from the production host (110). The backup storage (120) may also include the functionality to merge pseudo-asset backups with other pseudo-asset backups and/or asset backups to generate asset backups. The backup storages (120) may include any number of backup storages (e.g., backup storage A (120A), backup storage B (120B), backup storage N (120N)). The backup storages (120) may include other and/or additional functionality without departing from the invention. For additional information regarding the backup storages (120), refer to e.g., FIG. 1C.

In one or more embodiments of the invention, each backup storage (e.g., 120A, 120B, 120N) of the backup storages (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage (e.g., 120A, 120B, 120N) described throughout this application.

In one or more embodiments of the invention, each of the backup storages (e.g., 120A, 120B, 120N) of the backup storages (120) is implemented as a logical device. The logical device may utilize the computing resources of any number of computing devices and thereby provide the functionality of the backup storages (e.g., 120A, 120B, 120N) described throughout this application.

Figure 1B:
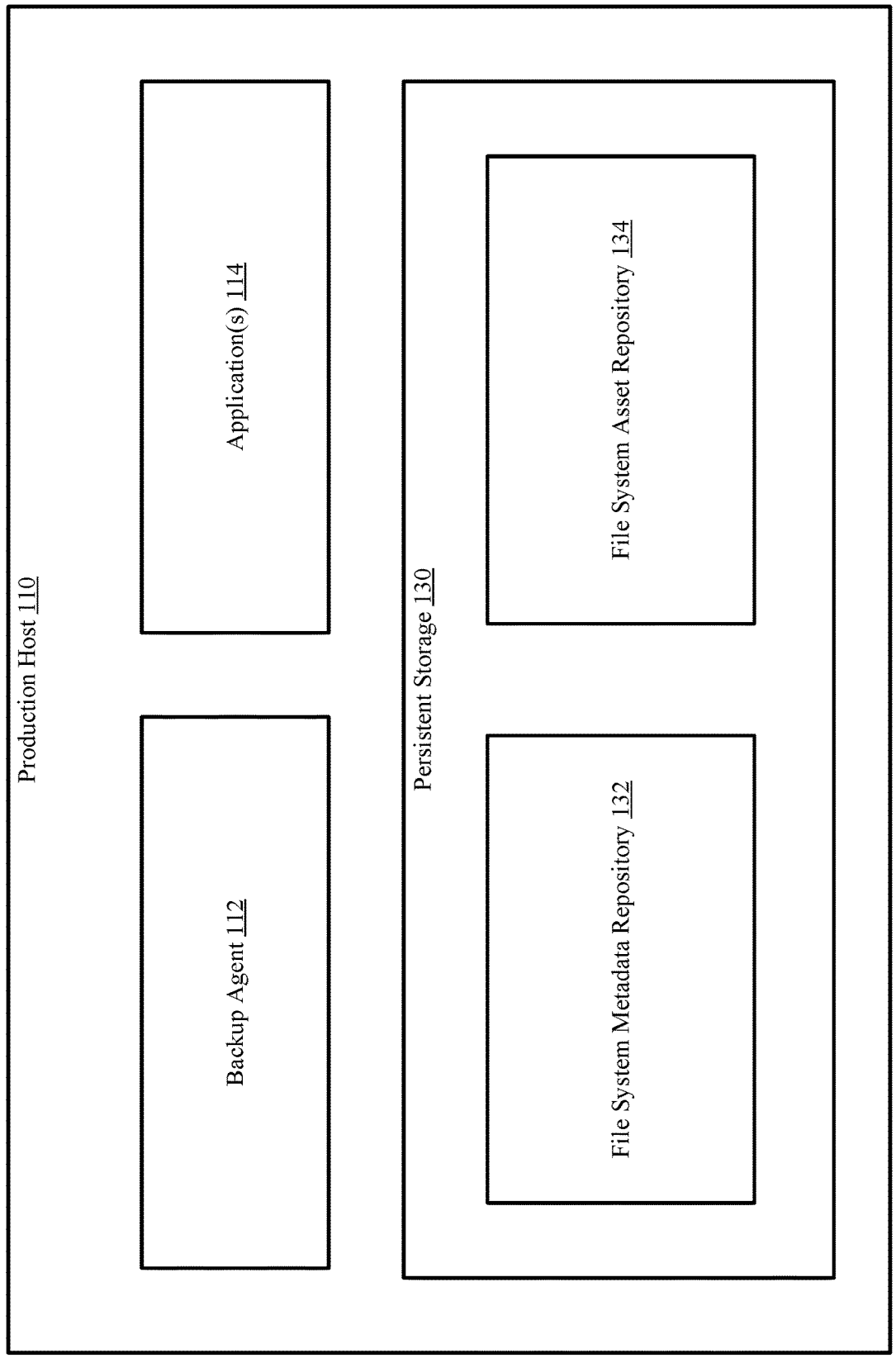
FIG. 1B shows a diagram of a production host in accordance with one or more embodiments of the invention.

FIG. 1B shows a diagram of a production host in accordance with one or more embodiments of the invention. The production host (110) may be an embodiment of the production host (110, FIG. 1A) discussed above. As discussed above, the production host (110) may provide services to the client(s) (100) and generate and provide pseudo-asset backups to the backup storages (120). The production host (110) may also initiate the merging of pseudo-asset backups with other pseudo-asset backups or other asset backups to generate asset backups. The production host (110) may include a backup agent (112), application(s) (114) and persistent storage (130). The production host (110) may include additional, fewer, and/or different components without departing from the invention. Each of the aforementioned components of the production host (110) is discussed below.

In one or more embodiments of the invention, the production host (110) includes a backup agent (112). The backup agent (112) may include the functionality to generate pseudo-asset backups of assets of a file system (not shown) of the production host (110) and send the pseudo-assets to the backup storages (120). In one or more embodiments of the invention, a file system is an organizational data structure that tracks how data is stored and retrieved in a system (e.g., in persistent storage of the production host (110)). The file system may specify references to assets and any data associated with each asset. An asset may be an individual object in the file system. An asset may be, for example, a file. A pseudo-asset may be a portion of the asset. The pseudo-asset backup generated may include a copy of portions of an asset for one or more specified applications associated with a specified point in time. Other components of the system illustrated in FIG. 1A (e.g., a backup manager of a backup storage (see, e.g., FIG. 1C) may include the functionality to generate pseudo-asset backups as discussed throughout this application. The pseudo-asset backups may be generated via the methods illustrated in FIGS. 3A-3C.

In one or more embodiments of the invention, the backup agent (112) may further include functionality to initiate the merging of pseudo-asset backups with other pseudo-asset backups or other asset backups to generate asset backups. The backup agent may also include the functionality to maintain a file system metadata repository (132) (discussed below). The backup agent (112) may include other and/or additional functionality without departing from the invention.

In one or more embodiments of the invention, the backup agent (112) may generate and provide to the backup storages (120) the pseudo-asset backups based on backup policies (not shown) implemented by the backup agent (112). The backup policies may specify a schedule in which data obtained and/or generated using applications (e.g., 114) and/or portions of applications (e.g., 114) are to be backed up. The backup agent (112) may be triggered to generate pseudo-asset backups and provide the pseudo-asset backups to the backup storage (120) in response to a backup policy. Alternatively, one or more of the pseudo-asset backups may be generated and provided to the backup storages (120) in response to a backup request triggered by the client(s) (100). The backup request may specify the data generated and/or obtained using application(s) (114) to be backed up.

In one or more embodiments of the invention, the backup agent (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (112) described throughout this application.

In one or more embodiments of the invention, the backup agent (112) is implemented as computer instructions, e.g., computer code, stored on a persistent storage that when executed by a processor of the production host (110) causes the production host (110) to provide the functionality of the backup agent (112) described throughout this application.

In one or more embodiments of the invention, the production host (110) hosts one or more application(s) (114). In one or more embodiments of the invention, the application(s) (114) perform services for clients (e.g., 100). The services may include writing, reading, and/or otherwise modifying data that is stored in the production host (110). The application(s) (114) may each include functionality for writing data to the production host (110). The application(s) (114) may be, for example, instances of databases, email servers, and/or other applications. The production host (110) may host other types of applications without departing from the invention.

In one or more of embodiments of the invention, the application(s) (114) is implemented as computer instructions, e.g., computer code, stored on a persistent storage that when executed by a processor(s) of the production host (110) cause the production host (110) to provide the functionality of the application(s) (114) described throughout this application.

In one or more embodiments of the invention, the persistent storage (130) stores data. The data stored in persistent storage (130) may include asset data and asset metadata associated with assets of a file system on the production host (110). The data may be generated by the client(s) using the application(s) (114). The persistent storage (130) may store other and/or additional data without departing from the invention. The persistent storage may include a file system metadata repository (132) and a file system asset repository (134). Each of these data structures is discussed below.

In one or more embodiments of the invention, the file system metadata repository (132) includes one or more data structures that include information associated with assets of the file system. The file system metadata repository (132) may include other and/or additional information without departing from the invention. For additional information regarding the files system metadata repository (132), refer to e.g., FIG. 2.

In one or more embodiments of the invention, the files system asset repository (134) includes one or more data structures that includes the assets of the file system of the production host (110). The file system asset repository (134) may include asset data associated with the assets of the file system. The backup agent (112) may copy the asset data of the file system metadata repository to generate pseudo-asset backups. The backup agent (112) may monitor changes made to the file system asset repository (134) and may update the file system metadata repository (132) based on the changes made to the file system asset repository (134). The file system asset repository (134) may include other and/or additional data and may be used for other and/or additional purposes without departing from the invention.

The persistent storage (130) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
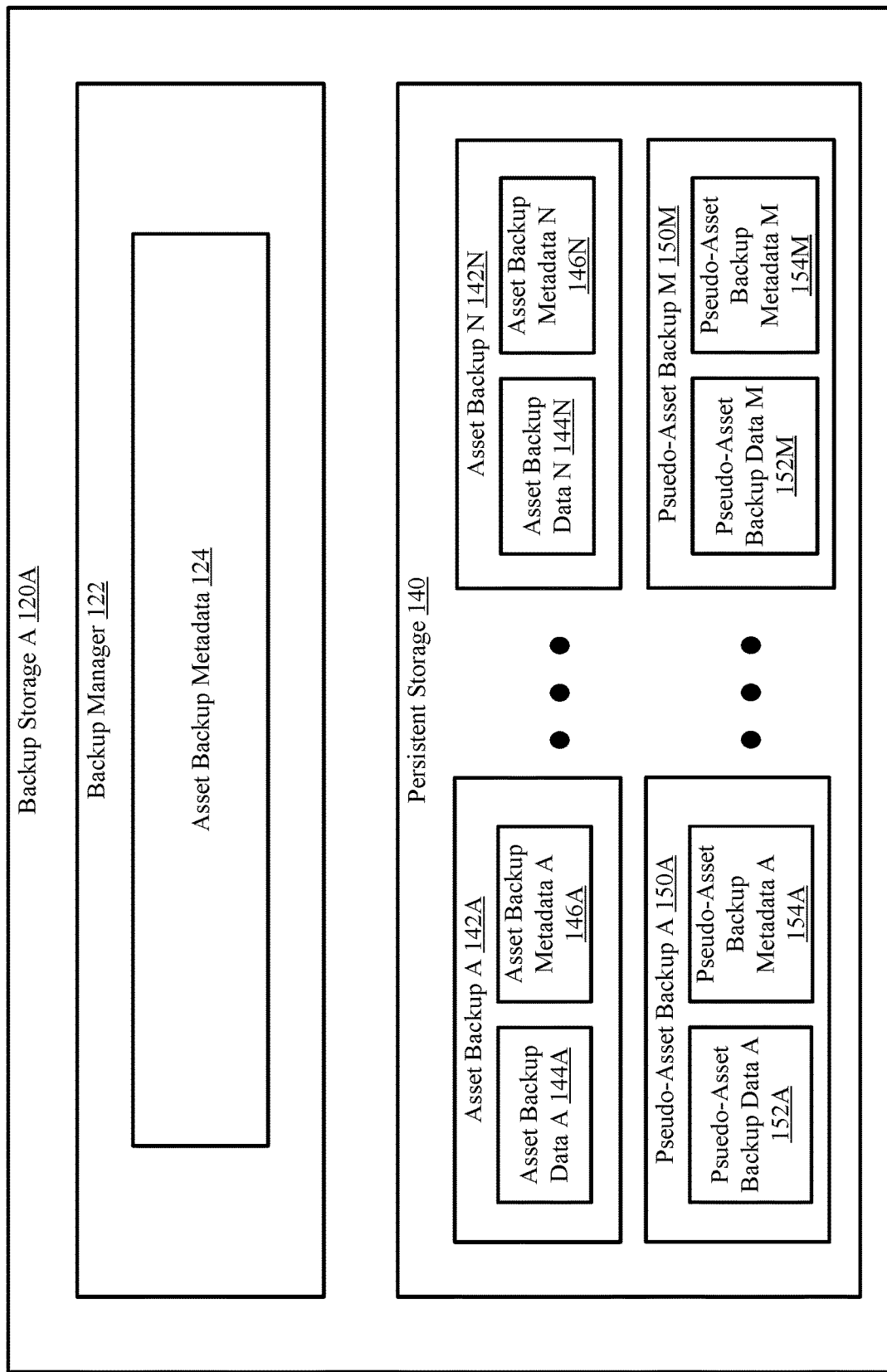
FIG. 1C shows a diagram of a backup storage of backup storages in accordance with one or more embodiments of the invention.

FIG. 1C shows a diagram of a backup storage of backup storages in accordance with one or more embodiments of the invention. The backup storage (backup storage A (120A)) may be an embodiment of the backup storages (120, FIG. 1A) discussed above. As discussed above backup storage A (120A) stores asset backups and pseudo-asset backups. Backup storage A may include a backup manager (122) and persistent storage (140). Backup storage A (120A) may include additional, fewer, and/or different components without departing from the invention. Each of the aforementioned components of backup storage A (120A) is discussed below.

In one or more embodiments of the invention, backup storage A (120A) includes a backup manager (122). The backup manager (122) may include the functionality to merge pseudo-asset backups with other pseudo-asset backups or other asset backups to generate asset backups. The backup manager (122) may store asset backups and pseudo-asset backups in persistent storage (e.g., 140). The backup manager (122) may obtain pseudo-asset backups from the production host (110, FIG. 1A) and/or other backup storages (e.g., 120B, 120N, FIG. 1A). The backup manager (122) may provide pseudo-asset backups and/or asset backups to other backup storages (e.g., 120B, 120N, FIG. 1A) and/or the production host (110, FIG. 1A). The backup manager (122) may generate, use, and maintain asset backup metadata (124, discussed below). The backup manager (122) may include the functionality to perform all, or a portion of, the methods illustrated in FIGS. 3A-3C. The backup manager (122) may include other and/or additional functionality without departing from the invention.

In one or more embodiments of the invention, the backup manager (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (122) described throughout this application.

In one or more embodiments of the invention, the backup manager (122) is implemented as computer instructions, e.g., computer code, stored on a persistent storage that when executed by a processor of backup storage A (120A) causes backup storage A (120A) to provide the functionality of the backup manager (122) described throughout this application.

In one or more embodiments of the invention, asset backup metadata (124) is one or more data structures that includes information regarding asset backups and pseudo-asset backups stored in backup storage A (120A). The asset backup metadata (124) may include storage locations associated with each asset backup and pseudo-asset backup. The storage locations may indicate which backup storage (e.g., 120A) of the backup storages (120, FIG. 1A) asset backups and pseudo-asset backups are stored. The storage locations may include backup storage identifiers (i.e., a unique combination of bits associated with a backup storage) that may be used to differentiate between the backup storages (e.g., 120A, 120B, 120N, FIG. 1A). The asset backup metadata (124) may include asset backup identifiers associated with asset backups, and pseudo-asset backup identifiers associated with pseudo-asset backups. The asset backup identifiers may be unique combinations of bits associated with asset backups. The pseudo-asset backup identifiers may be unique combinations of bits associated with pseudo-asset backups. The asset backup metadata may include asset identifiers associated with asset backups and pseudo-asset backups. The asset identifiers may be an embodiment of the asset identifiers discussed below (see, e.g., FIG. 2). The asset backup metadata (124) may include timestamps associated with asset backups and pseudo-asset backups the denote a specific time and data when asset backups and pseudo-asset backups are generated. The asset backup metadata (124) may include backup types associated with asset backups and/or pseudo-asset backups. The backup types may be full backups, incremental backups, or synthetic full backups. The asset backup metadata (124) may include storage locations of asset backups and pseudo-asset backups.

A full backup may be a backup that includes all of the data associated with an asset. An incremental backup may be a backup that includes the data of an asset that has changed since the generation of a previous backup associated with the asset. The synthetic full backups may be backups that include the changed data of an incremental backup that has been merged with a previous full backup or synthetic full backup. The synthetic full backup may be associated with a specific point in time. The aforementioned backup types may include other and/or additional information without departing from the invention.

The asset backup metadata (124) may be generated and/or updated by the backup manager (122) when the backup manager (122) stores a new asset backup or pseudo-asset backup. The asset backup metadata (124) may be used by the backup manager (122) to merge pseudo-asset backups with other pseudo-asset backups or other asset backups to generate asset backups. The asset backup metadata (124) may include other and/or additional information and may be used for other and/or additional purposes without departing from the invention.

In one or more embodiments of the invention, the persistent storage (140) stores data. The data stored in persistent storage (140) may include asset backups (e.g., asset backup A (142A), asset backup N (142N)) and pseudo-asset backups (e.g., pseudo-asset backup A (150A), pseudo-asset backup M (150M)). There may be a different number of asset backups (e.g., 142A, 142N) stored in persistent storage (140) than pseudo-asset backups (e.g., 150A, 150M). Each asset backup may include asset backup data (e.g., asset backup data A (144A), asset backup data N (144N)) and asset backup metadata (e.g., asset backup metadata A (146A), asset backup metadata N (146N)). The asset backup data (e.g., 144A, 144N) may include the copy of data associated with an asset in its entirety. The asset backup metadata (e.g., 146A, 146N) may include information regarding the asset backup data (e.g., 144A, 144N). The information may include asset backup identifiers, asset identifiers (discussed above), asset structure, change information, (discussed below) and/or other and/or additional information regarding the asset backup data (e.g., 144A, 144N) without departing from the invention. The pseudo-asset backup data (e.g., 152A, 152M) may include copies of data associated with portions of an asset (i.e., one or more asset components). The pseudo-asset backup metadata (e.g., 154A, 154M) may include information regarding the pseudo-asset backup data (e.g., 152A, 152M). The information may include asset backup identifiers, asset identifiers (discussed above), asset structure, change information, (discussed below) and/or other and/or additional information regarding the pseudo-asset backup data (e.g., 152A, 152M) without departing from the invention. The persistent storage (140) may store other and/or additional data without departing from the invention.

The persistent storage (140) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (140) may utilize portions of any combination of hard disk drives, solid state disk drives, tape drives, and/or any other physical storage medium of any number of computing devices.

Figure 2:
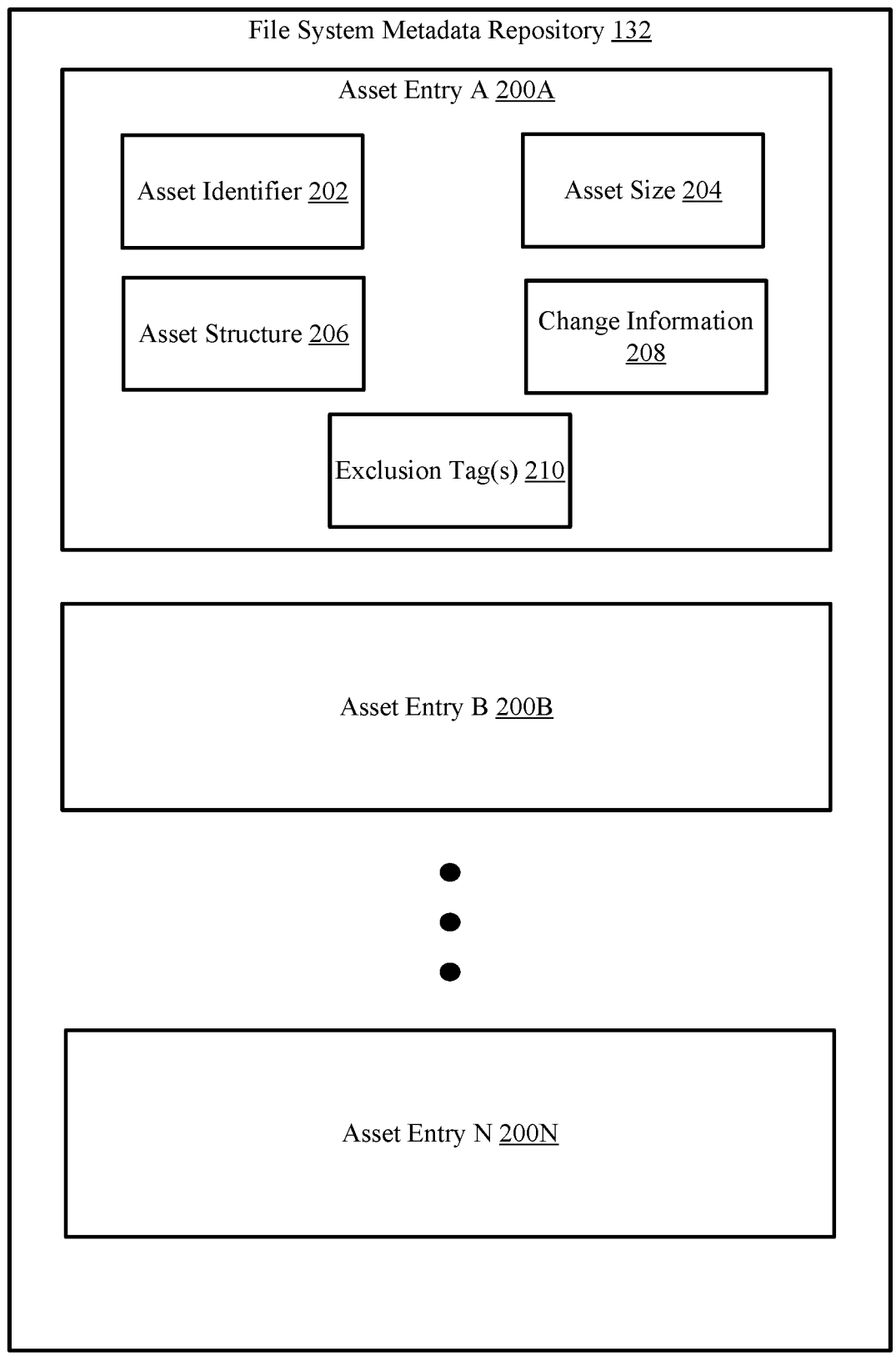
FIG. 2 shows a diagram of a file system metadata repository in accordance with one or more embodiments of the invention.

FIG. 2 shows a diagram of a file system metadata repository in accordance with one or more embodiments of the invention. The file system metadata repository (132) may be an embodiment of the file system repository (132, FIG. 1B) discussed above. As discussed above, the file system asset repository (134) may include one or more data structures that include information associated with assets of the file system of the production host (110, FIG. 1A). The file system metadata repository (132) may include one or more asset entries (e.g., asset entry A (200A), asset entry B (200B), asset entry N (200N)). The file system metadata repository (132) may include other and/or additional data without departing from the invention. The asset entries (e.g., 200A, 200B, 200N) are discussed below.

An asset entry (e.g., 200A) may include an asset identifier (202), an asset size (204), an asset structure (206), change information (208), and exclusion tag(s) (210). An asset entry (e.g., 200A) may include other and/or additional information without departing from the invention. Each of the components of an asset entry (e.g., 200A) is discussed below.

In one or more embodiments of the invention, the asset identifier (202) is one or more data structures that is used to differentiate asset entry A (200A) from other asset entries (e.g., 200B, 200N) and to specify that asset entry A (200A) is associated with the asset corresponding with the asset identifier (202). Each asset entry (e.g., 200A, 200B, 200N) is associated with an asset of the file system asset repository (134, FIG. 1B). The asset identifier (202) may be generated and assigned by the backup agent (112) when an asset is created on the production host (110, FIG. 1B). The asset identifier (202) may be a unique combination of bits that is associated with an asset of the file system asset repository (134, FIG. 1B). The asset identifier (202) may be used by the backup agent (112, FIG. 1B) to perform all or a portion of the methods depicted in FIGS. 3A-3C. The asset identifier (202) may include other and/or additional information and may be used for other and/or additional purposes without departing from the invention.

In one or more embodiments of the invention, the asset size (204) is one or more data structures that is used to determine the size of the asset that is associated with asset entry A (200A). The asset size may (204) be a number that denotes the total amount of data included in the asset. The number may be associated with a unit of digital information such as a byte. There may be any number of bytes included in the asset. The asset size (204) may also include the sizes of the components of the asset associated with the asset size (204). The asset size (204) may include a list of asset component identifiers and asset component sizes in bytes associated with the asset component identifiers. The asset size (204) may be used by the backup agent (112, FIG. 1B) to divide the asset associated with asset entry A (200A) into pseudo-assets. The asset size (204) may be used by the backup agent (112, FIG. 1B) to perform all or a portion of the methods depicted in FIGS. 3A-3C. The asset size (204) may include other and/or additional information and may be used for other and/or additional purposes without departing from the invention.

In one or more embodiments of the invention, the asset structure (206) is one or more data structures that is used to determine the hierarchical structure of the asset associated with asset entry A (200A). The asset structure (206) may be an asset tree, which may depict a top level folder (i.e., the asset) and subfolders and/or files within the top level folder (i.e., the asset components). The asset structure (206) may be generated by the backup agent (112, FIG. 1B) or another component of the production host (110, FIG. 1A) discussed above when the asset associated with asset entry A (200A) was generated. The asset structure (206) may be updated by the backup agent (112, FIG. 1B) or another component of the production host (110, FIG. 1A) discussed above when the asset associated with asset entry A (200A) is modified to reflect the modifications made to the asset. The asset structure (206) may be used by the backup agent (112, FIG. 1B) to divide the asset associated with asset entry A (200A) into pseudo-assets and to assign asset components to backup threads via the methods depicted in FIGS. 3A-3C. The asset structure (206) may include other and/or additional information associated with the structure of the asset associated with asset entry A (200A) and may be used for other and/or additional purposes without departing from the invention.

In one or more embodiments of the invention, the change information (208) is one or more data structures that is used to track the changes made to the asset that is associated with asset entry A (200A). The change information (208) may include a list of changes made to the asset associated with asset entry A (200A) following the creation of the asset. The changes included in the change information (208) may be associated with a timestamp (not shown) that denotes the point in time the changes were made. The timestamp may include a date and a time. The changes included in the change information (208) may also be associated with all or a portion of the asset components of the asset. The changes to the asset included in the change information (208) may include adding asset component(s) to the asset, modifying asset component(s) of the asset, and/or deleting asset components from the asset. The change information (208) may be updated by the backup agent (112, FIG. 1B) or another component of the production host (110, FIG. 1B) discussed above when the asset associated with asset entry A (200A) is modified to reflect the changes. The change information (208) may be used by the backup agent (112, FIG. 1B) to divide the asset into pseudo-assets to generate incremental pseudo-asset backup as depicted in FIG. 3B. The change information (208) may include other and/or additional information regarding changes made to the asset associated with asset entry A (200A) and may be used for other and/or additional purposes without departing from the invention.

In one or more embodiments of the invention, the exclusion tags (210) are one or more data structures that are used to determine whether to exclude asset components of the asset associated with asset entry A (200A) from backup threads of an asset backup operation. An asset backup operation may refer to a process executed by the backup agent (112, FIG. 1A) that results in the generation of an asset backup. The execution of an asset backup operation may result in the performance of all and/or a portion of the methods depicted in FIGS. 3A-3C. A backup thread may be a portion or a subset of the process of the asset backup operation. An asset backup operation may include any number of backup threads. The backup threads may be executed in parallel. An exclusion tag of the exclusion tags (210) may be a variable, which when present in asset entry A (200A) and assigned to an asset component associated with asset entry A (200A) denotes that the asset component associated with the exclusion tag is to excluded from an asset backup operation. Each exclusion tag of the exclusion tags (210) may be associated with an asset component. The exclusion tags (210) may be assigned to asset components by users of the client(s) (100, FIG. 1A). The exclusion tags (210) may be used by the backup agent (112, FIG. 1B) to exclude asset components from an asset backup. The exclusion tags (210) may include other and/or additional information that may be used to exclude asset components without departing from the invention.

Figure 3A:
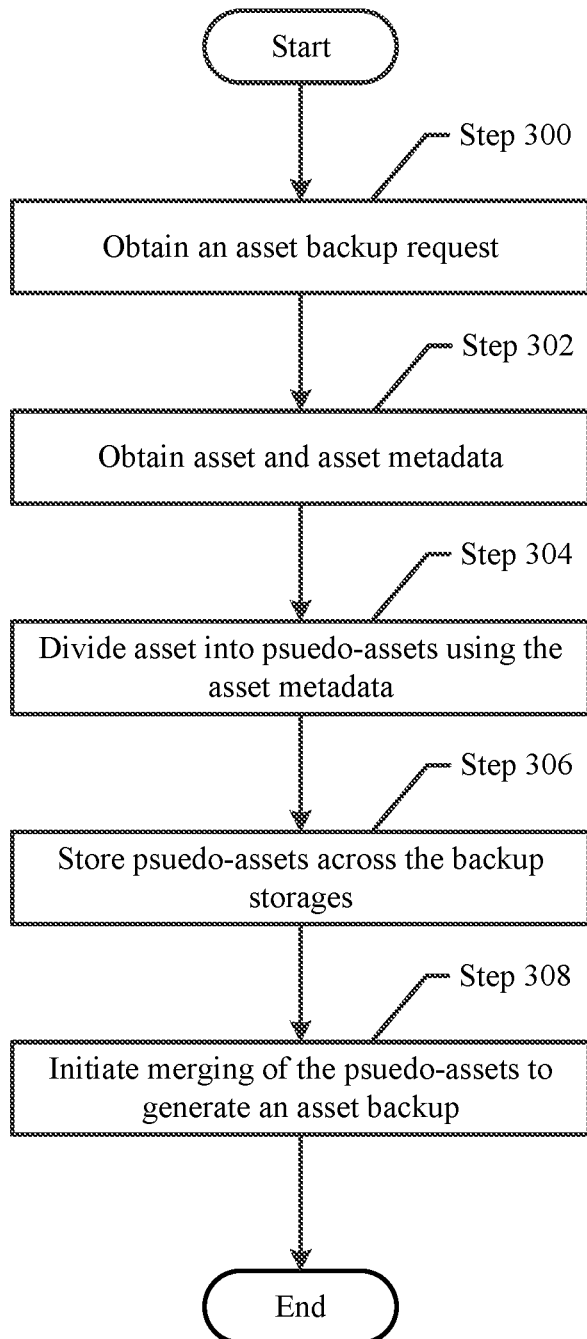
FIG. 3A shows a flowchart of a method for generating backups using pseudo-assets in accordance with one or more embodiments of the invention.
Figure 3B:
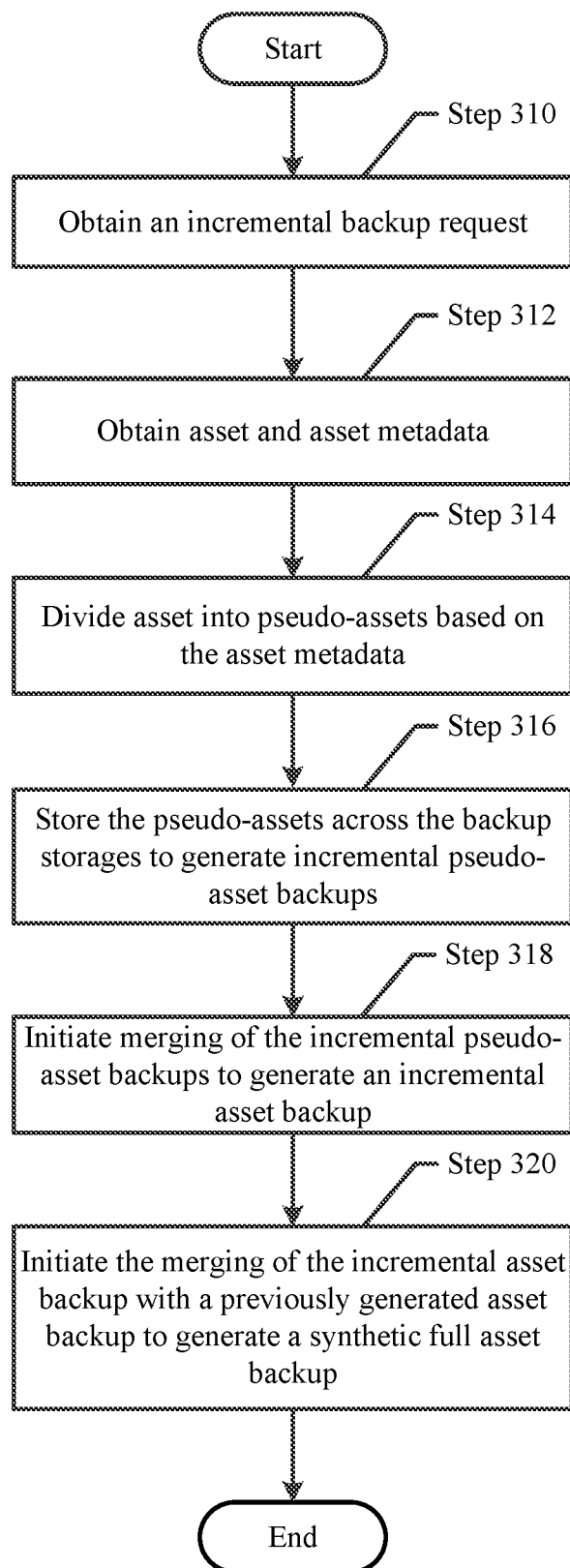
FIG. 3B shows a flowchart of a method for generating incremental backups using pseudo-assets in accordance with one or more embodiments of the invention.

FIG. 3A shows a flowchart of a method for generating backups using pseudo-assets in accordance with one or more embodiments of the invention. The method shown in FIG. 3A may be performed by, for example, a backup agent of a production host (112, FIG. 1B). Other components of the system illustrated in FIG. 1A may perform all, or a portion, of the method of FIG. 3A without departing from the invention. While various steps in the flowchart are presented and described sequentially, one of ordinary skill in the relevant are will appreciate that some or all of the steps may be executed in different orders, may be combined or omitted, and some or all of the steps may be executed in parallel.

In step 300, an asset backup request is obtained. In one or more embodiments of the invention, the client(s) sends a message to the production host. The message may include a request to generate a backup of an asset. The request may include an asset identifier that specifies the asset. The request may be obtained from the client(s) via other and/or additional methods without departing from the invention.

In step 302, an asset and asset metadata are obtained. In one or more embodiments of the invention, the backup agent of the production host uses the asset identifier to obtain the asset and the asset metadata. The backup agent may compare the asset identifiers included in the file system asset repository with the asset identifier obtained from the asset backup request. The backup agent may identify the asset associated with the asset identifier that matches the asset identifier included in the asset backup request as the asset to include in the asset backup operation. The backup agent then obtains the identified asset from the file system asset repository. The obtained asset may be a copy of the identified asset. The asset may be obtained via other and/or additional methods without departing from the invention.

In one or more embodiments of the invention, the backup agent may compare the asset identifiers included in the asset entries of the file system metadata repository with the asset identifier obtained from the asset backup request. The backup agent may identify the asset metadata (i.e., the asset entry) with the asset identifier that matches the asset identifier included in the asset backup request as the asset to include in the asset backup operation. The backup agent then obtains the identified asset metadata from the file system metadata repository. The obtained asset metadata may be a copy of the identified asset metadata. The asset metadata may be obtained via other and/or additional methods without departing from the invention.

In step 304, the asset is divided into pseudo-assets using the asset metadata.

In one or more embodiments of the invention, the backup agent uses the asset size and asset structure of the asset entry of the asset metadata to divide the obtained asset into pseudo-assets. The asset size and asset structure may indicate a logical division of asset components to divide into pseudo-assets, where computational resources may be evenly distributed to generate the pseudo-asset backups. The backup agent may divide the asset data into pseudo-asset asset data based on the logical division indicated by the asset size and asset structure. The backup agent may also divide the asset metadata (i.e., the asset entry) into pseudo-asset metadata that corresponds with the pseudo-asset data. The backup agent may include the asset identifier of the asset from which the pseudo-assets were divided in the pseudo-asset metadata to associate the pseudo-asset with the asset. The generation of pseudo-asset data and pseudo-asset metadata associated with the pseudo-asset data may result in the generation of pseudo-asset backups. The asset may be divided into pseudo-assets using the asset metadata via other and/or additional methods without departing from the invention.

For example, the asset structure of the asset metadata may indicate that the asset may include four folders. The asset data of the asset metadata may indicate that the first folder includes a large amount of data, and the other three folders together include about the same amount of data as the large folder. The backup agent may divide the asset into two separate pseudo-assets. The first pseudo-asset may include the data of the first folder and the asset metadata (i.e., asset structure and asset size) associated with the first folder. The second pseudo-asset may include the data of the other three folders and the asset metadata (i.e., asset structure and asset size) associated with the other three folders. The backup agent may divide the asset as mentioned above and generate a backup of the pseudo-assets to balance the computational resources required to generate a backup of asset and increase to efficiency of generating a backup of the asset as both pseudo-assets include around the same amount of data.

In step 306, the pseudo-assets are stored across the backup storages. In one or more embodiments of the invention, the backup agent sends the pseudo-assets to backup storages. The backup agent may send both the pseudo-asset data and the pseudo-asset metadata to the backup storages. The backup agent may send messages to the backup storages. The messages may include a requests to store the pseudo-assets. In response to obtaining the requests, the backup storages may store the pseudo-asset data and corresponding pseudo-asset metadata of pseudo-assets in persistent storage to generate pseudo-asset backups. The backup storages may update asset backup metadata to reflect the storage locations of the pseudo-asset backups. The backup managers of the backup storages may assign pseudo-asset backup identifiers and timestamps (that denote when the pseudo-asset backups were generated) to the pseudo-asset backups and associate the pseudo-asset backup identifiers with the asset identifier included in the pseudo-asset metadata of the pseudo-asset backup. The backup managers of the backup storages may include the pseudo-asset backup identifiers and the timestamp in the pseudo-asset backup metadata of the pseudo-asset backups and may also include copies of the pseudo-asset backup identifiers in the asset backup metadata of the backup storages. The pseudo-assets may be stored across the backup storages via other and/or additional methods without departing from the invention.

In step 308, the merging of the pseudo-assets is initiated to generate an asset backup. In one or more embodiments of the invention, the backup agent of the production host sends messages to the backup storages. The messages may include requests for merging the recently stored pseudo-asset backups of the pseudo-assets to generate an asset backup. The messages may also include the asset identifier associated with the pseudo-asset backups. The merging of the pseudo-assets may be initiated to generate an asset backup via other and/or additional methods without departing from the invention.

In response to the requests, the backup storages may identify the recently stored pseudo-asset backups associated with the asset identifier included in the message using the asset identifiers, pseudo-asset backup identifiers, and timestamps included in the asset backup metadata. The backup storages may merge the pseudo-asset backup data of the pseudo-assets to generate asset backup data. The backup storages may merge the pseudo-asset backup metadata of the pseudo assets to generate asset metadata. The backup storages may store the asset backup data and asset backup metadata in persistent storage to generate an asset backup. The backup storages may update the asset backup metadata to include an asset backup identifier associated with the asset backup and a timestamp depicting when the asset backup was generated and may associate the asset backup identifier with the asset identifier.

The method may end following step 308.

The method depicted in FIG. 3A may be used to generate backups using pseudo-assets as discussed above. An asset may be divided in any logical way to generate pseudo-assets as the pseudo-assets backups associated with the pseudo-assets are later merged together to generate a single asset backup that include the asset data and asset metadata associated with the asset in their entirety. The division of assets into pseudo-assets allows for the parallelization of the asset backup operation and may improve the efficiency of generating backups of assets as opposed to generating asset backups in a sequential manner.

FIG. 3B shows a flowchart of a method for generating incremental backups using pseudo-assets in accordance with one or more embodiments of the invention. The method shown in FIG. 3B may be performed by, for example, a backup agent of a production host (112, FIG. 1B). Other components of the system illustrated in FIG. 1A may perform all, or a portion, of the method of FIG. 3B without departing from the invention. While various steps in the flowchart are presented and described sequentially, one of ordinary skill in the relevant are will appreciate that some or all of the steps may be executed in different orders, may be combined or omitted, and some or all of the steps may be executed in parallel.

In step 310, an incremental backup request is obtained. In one or more embodiments of the invention, the client(s) sends a message to the production host. The message may include a request to generate an incremental backup of an asset. The request may include an asset identifier that specifies the asset. The request may be obtained from the client(s) via other and/or additional methods without departing from the invention.

In step 312, an asset and asset metadata is obtained. In one or more embodiments of the invention, the backup agent of the production host uses the asset identifier to obtain the asset and the asset metadata. The backup agent may compare the asset identifiers included in the file system asset repository with the asset identifier obtained from the asset backup request. The backup agent may identify the asset associated with the asset identifier that matches the asset identifier included in the asset backup request as the asset to include in the asset backup operation. The backup agent then obtains the identified asset from the file system asset repository. The obtained asset may be a copy of the identified asset. The asset may be obtained via other and/or additional methods without departing from the invention.

In one or more embodiments of the invention, the backup agent may compare the asset identifiers included in the asset entries of the file system metadata repository with the asset identifier obtained from the asset backup request. The backup agent may identify the asset metadata (i.e., the asset entry) with the asset identifier that matches the asset identifier included in the asset backup request as the asset to include in the asset backup operation. The backup agent then obtains the identified asset metadata from the file system metadata repository. The obtained asset metadata may be a copy of the identified asset metadata. The asset metadata may be obtained via other and/or additional methods without departing from the invention.

In step 314, the asset is divided into pseudo-assets based on the asset metadata. In one or more embodiments of the invention, the backup agent uses the asset size, the asset structure, and change information of the asset entry of the asset metadata to divide the obtained asset into pseudo-assets. The change information may indicate the changes made to the asset since the last backup of the asset was generated as discussed above. The change information may specify the asset components of the asset that were modified since the generation of the previous backup of the asset. The asset size, asset structure, and change information may indicate a logical division of asset components to divide the asset into pseudo-assets, where computational resources may be evenly distributed to generate the incremental pseudo-asset backups. The backup agent may divide the modified asset data into pseudo-asset data based on the logical division indicated by the asset size, asset structure, and change information. The asset data may only include the asset data that has been modified since the generation of the previously generated asset backup associated with the asset as indicated by the change information. The backup agent may also divide the asset metadata (i.e., the asset entry) into pseudo-asset metadata that corresponds with the pseudo-asset data. The backup agent may include the asset identifier of the asset from which the pseudo-assets were divided in the pseudo-asset metadata to associate the pseudo-asset with the asset. The generation of pseudo-asset data and pseudo-asset metadata associated with the pseudo-asset data may result in the generation of incremental pseudo-asset backups. The asset may be divided into pseudo-assets using the asset metadata via other and/or additional methods without departing from the invention.

For example, the asset structure of the asset metadata may indicate that the asset may include four folders. The change information indicates that only the second, third, and fourth folders were modified since the generation of a previous backup of the asset. The asset data of the asset metadata may indicate that the second folder includes a large amount of data, and the third and fourth folders together include about the same amount of data as the second folder. The backup agent may divide the asset into two separate pseudo-assets. The first pseudo-asset may include the data of the second folder and the asset metadata (i.e., asset structure and asset size) associated with the second folder. The second pseudo-asset may include the data of the third and fourth folders and the asset metadata (i.e., asset structure and asset size) associated with the third and fourth folders. The backup agent may divide the asset as mentioned above and generate incremental backups of the pseudo-assets to balance the computational resources required to generate an incremental backup of asset and increase to efficiency of generating a backup of the asset as both pseudo-assets include around the same amount of data. The first folder may not be included in the pseudo-assets as the first folder was not modified since the previous backup of the asset was generated.

In step 316, the pseudo-assets are stored across the backup storages to generate incremental pseudo-asset backups. In one or more embodiments of the invention, the backup agent sends the pseudo-assets to backup storages. The backup agent may send both the pseudo-asset data and the pseudo-asset metadata to the backup storages. The backup agent may send messages to the backup storages. The messages may include a requests to store the pseudo-assets.

In response to obtaining the requests, the backup storages may store the pseudo-asset data and corresponding pseudo-asset metadata of pseudo-assets in persistent storage to generate incremental pseudo-asset backups. The backup storages may update asset backup metadata to reflect the storage locations of the incremental pseudo-asset backups. The backup managers of the backup storages may assign pseudo-asset backup identifiers to the pseudo-asset backups and timestamps (that denote when the incremental pseudo-asset backups were generated), and associate the pseudo-asset backup identifiers with the asset identifier included in the pseudo-asset metadata of the incremental pseudo-asset backups. The backup managers of the backup storages may include the pseudo-asset backup identifiers and the timestamp in the pseudo-asset backup metadata of the incremental pseudo-asset backups and may also include copies of the pseudo-asset backup identifiers in the asset backup metadata of the backup storages. The pseudo-assets may be stored across the backup storages to generate incremental pseudo-asset backups via other and/or additional methods without departing from the invention.

In step 318, the merging of the incremental pseudo-asset backups to generate an incremental asset backup is initiated. In one or more embodiments of the invention, the backup agent of the production host sends messages to the backup storages. The messages may include requests for merging the recently stored incremental pseudo-asset backups of the pseudo-assets to generate an incremental asset backup. The messages may also include the asset identifier associated with the incremental pseudo-asset backups. The merging of the pseudo-assets may be initiated to generate an incremental asset backup via other and/or additional methods without departing from the invention.

In response to the requests, the backup storages may identify the recently stored incremental pseudo-asset backups associated with the asset identifier included in the messages using the asset identifiers, pseudo-asset backup identifiers, and timestamps included in the asset backup metadata. The backup storages may merge the pseudo-asset backup data of the pseudo-assets to generate asset backup data. The backup storages may merge the pseudo-asset backup metadata of the pseudo assets to generate asset metadata. The backup storages may store the asset backup data and asset backup metadata in persistent storage to generate an incremental asset backup. The backup storages may update the asset backup metadata to include an asset backup identifier associated with the incremental asset backup and a timestamp depicting when the incremental asset backup was generated and associate the asset backup identifier with the asset identifier.

In step 320, the merging of the incremental pseudo-asset backup with a previously generated asset backup is initiated to generate a synthetic full asset backup. In one or more embodiments of the invention, the backup agent of the production host sends messages to the backup storages. The messages may include requests for merging the recently stored incremental asset backup with a previously generated asset backup. The messages may also include the asset identifier associated with the incremental asset backup. The merging of the incremental asset backup with a previously generated asset backup may be initiated to generate a synthetic full asset backup via other and/or additional methods without departing from the invention.

In response to the requests, the backup storages may identify the recently stored incremental asset backup associated with the asset identifier included in the message and a previously generated asset backup associated with the asset using the asset identifiers, asset backup identifiers, and timestamps included in the asset backup metadata. The backup storages may merge the asset backup data of the incremental asset backup with the asset backup data of the previously generated asset backup to generate asset backup data of the synthetic full backup. The backup storages may merge the asset backup metadata of the incremental asset backup with the asset backup metadata of the previously generated asset backup to generate asset metadata of the synthetic full backup. The backup storages may store the asset backup data and asset backup metadata in persistent storage to generate the synthetic full asset backup. The backup storages may update the asset backup metadata to include an asset backup identifier associated with the synthetic full asset backup and a timestamp depicting when the synthetic full asset backup was generated and associate the asset backup identifier with the asset identifier.

The method may end following step 320.

The method depicted in FIG. 3B may be used to generate incremental asset backups using pseudo-assets as discussed above. An asset may be divided in any logical way to generate pseudo-assets as the incremental pseudo-asset backups associated with the pseudo-assets are later merged together to generate a single incremental asset backup. Each incremental backup of an asset may be logically divided in a different way depending on the changes to the asset depicted in the change information. The division of assets into pseudo-assets allows for the parallelization of the asset backup operation and may improve the efficiency of generating incremental backups of assets as opposed to generating incremental asset backups in a sequential manner.

Figure 3C:
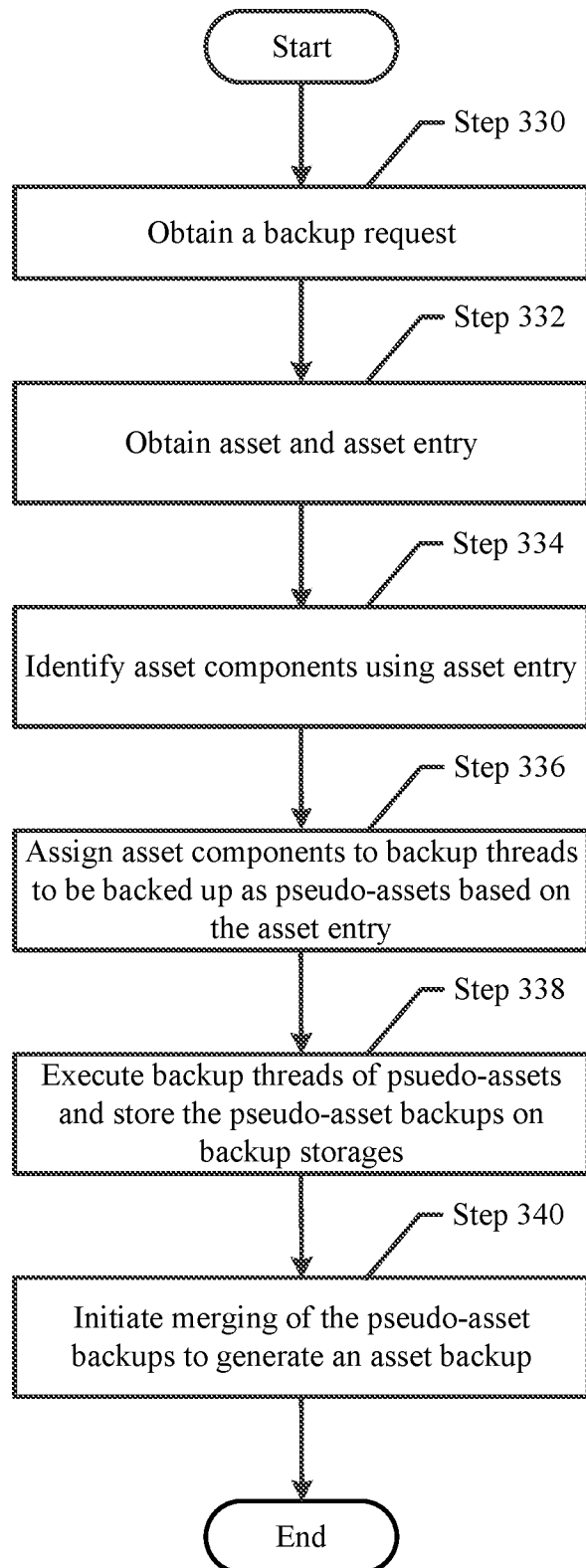
FIG. 3C shows a flowchart of a method for backing up asset components in accordance with one or more embodiments of the invention.

FIG. 3C shows a flowchart of a method for backing up asset components in accordance with one or more embodiments of the invention. The method shown in FIG. 3C may be performed by, for example, a backup agent of a production host (112, FIG. 1B). Other components of the system illustrated in FIG. 1A may perform all, or a portion, of the method of FIG. 3C without departing from the invention. While various steps in the flowchart are presented and described sequentially, one of ordinary skill in the relevant are will appreciate that some or all of the steps may be executed in different orders, may be combined or omitted, and some or all of the steps may be executed in parallel.

In step 330, a backup request is obtained. In one or more embodiments of the invention, the client(s) sends a message to the production host. The message may include a request to generate a backup of an asset. The request may include an asset identifier that specifies the asset. The request may be obtained from the client(s) via other and/or additional methods without departing from the invention.

In step 332, an asset and an asset entry is obtained. In one or more embodiments of the invention, the backup agent of the production host uses the asset identifier to obtain the asset and the asset entry. The backup agent may compare the asset identifiers included in the file system asset repository with the asset identifier obtained from the asset backup request. The backup agent may identify the asset associated with the asset identifier that matches the asset identifier included in the asset backup request as the asset to include in the asset backup operation. The backup agent then obtains the identified asset from the file system asset repository. The obtained asset may be a copy of the identified asset. The asset may be obtained via other and/or additional methods without departing from the invention.

In one or more embodiments of the invention, the backup agent may compare the asset identifiers included in the asset entries of the file system metadata repository with the asset identifier obtained from the asset backup request. The backup agent may identify the asset entry with the asset identifier that matches the asset identifier included in the asset backup request as the asset to include in the asset backup operation. The backup agent then obtains the identified asset entry from the file system metadata repository. The obtained asset entry may be a copy of the identified asset metadata. The asset entry may be obtained via other and/or additional methods without departing from the invention.

In step 334, asset components are identified using the asset entry. In one or more embodiments, the backup agent uses asset structure of the asset entry to identify asset components. The asset structure may include a hierarchical layout of all the asset components of an asset as discussed above. The backup agent may use the asset structure to identify all of the folders and/or files included in an asset as asset components. The asset components may be identified using the asset entry via other and/or additional methods without departing from the invention.

In step 336, the asset components are assigned to backup threads to be backed up as pseudo-assets based on the asset entry. In one or more embodiments of the invention, the backup agent uses the asset size, the asset structure, and exclusion tags of the asset entry of the asset metadata to assign the identified asset components to backup threads. The exclusion tags may be associated with asset components that are to be excluded from the backup threads of an asset backup operation as discussed above. The backup agent may ignore all asset components that include an exclusion tag and exclude the aforementioned asset components from the backup threads. The asset size and asset structure may indicate a logical division of asset components to divide and assign to separate backup threads, where computational resources may be evenly distributed to generate the pseudo-asset backups. The backup agent may assign the asset data associated with asset components to backup threads based on the logical division indicated by the asset size and asset structure (excluding the asset components associated with exclusion tags). The backup agent may also assign the asset metadata (i.e., the asset entry) associated with the asset components of assigned to a backup thread to the same backup thread. The asset components and asset metadata assigned a backup thread may result in a pseudo-asset when the backup thread is executed. The backup agent may include the asset identifier of the asset from which the asset components were assigned to backup threads in the asset metadata assigned to each backup thread. The asset components may be assigned to backup threads to be backed up as pseudo-assets based on the asset entry via other and/or additional methods without departing from the invention.

For example, the asset structure of the asset metadata may indicate that the asset may include twelve asset components. The asset components may include ten files and two folders as indicated by the asset structure of the asset entry. The asset entry may include an exclusion tag that is associated with the first folder. The asset size of the asset entry may indicate that the ten files are small and the two folders are large. The backup agent may assign the asset components to two separate backup threads. The first backup thread may include the asset data and the asset metadata (i.e., asset structure and asset size) associated with the second file. The second backup thread may include the data and the asset metadata (i.e., asset structure and asset size) associated with the ten files. The backup agent may assign the asset components to backup threads as mentioned above to balance the computational resources required to generate a backup of the asset and increase to efficiency of generating a backup of the asset as both threads include a balanced amount of data. The first folder may not be included in the backup threads as the first folder was associated with an exclusion tag.

In step 338, the backup threads are executed to generate pseudo-asset backups and the pseudo-asset backups are stored on the backup storages. In one or more embodiments of the invention, the backup agent executes the backup threads to generate pseudo-asset backups that are stored across the backup storages. Executing the backup threads may involve separating the asset components and asset component metadata into pseudo-assets that include pseudo-asset data and pseudo-asset metadata and sending the pseudo-assets to the backup storages concurrently.

The backup agent may send messages to the backup storages. The messages may include a requests to store the pseudo-assets. In response to obtaining the requests, the backup storages may store the pseudo-asset data and corresponding pseudo-asset metadata of pseudo-assets in persistent storage to generate pseudo-asset backups. The backup storages may update asset backup metadata to reflect the storage locations of the pseudo-asset backups. The backup managers of the backup storages may assign pseudo-asset backup identifiers to the pseudo-asset backups and timestamps (that denote when the pseudo-asset backups were generated), and associate the pseudo-asset backup identifiers with the asset identifier included in the pseudo-asset metadata of the pseudo-asset backups. The backup managers of the backup storages may include the pseudo-asset backup identifiers and the timestamp in the pseudo-asset backup metadata of the pseudo-asset backups and may also include copies of the pseudo-asset backup identifiers in the asset backup metadata of the backup storages.

In step 340, the merging of the pseudo-asset backups is initiated to generate an asset backup. In one or more embodiments of the invention, the backup agent of the production host sends messages to the backup storages. The messages may include requests for merging the recently stored pseudo-asset backups of the pseudo-assets to generate an asset backup. The messages may also include the asset identifier associated with the pseudo-asset backups. The merging of the pseudo-assets may be initiated to generate an asset backup via other and/or additional methods without departing from the invention.

In response to the requests, the backup storages may identify the recently stored pseudo-asset backups associated with the asset identifier included in the message using the asset identifiers, pseudo-asset backup identifiers, and timestamps included in the asset backup metadata. The backup storages may merge the pseudo-asset backup data of the pseudo-assets to generate asset backup data. The backup storages may merge the pseudo-asset backup metadata of the pseudo assets to generate asset metadata. The backup storages may store the asset backup data and asset backup metadata in persistent storage to generate an asset backup. The backup storages may update the asset backup metadata to include a asset backup identifier associated with the asset backup and a timestamp depicting when the asset backup was generated and associate the asset backup identifier with the asset identifier.

The method may end following step 340.

The method depicted in FIG. 3C may be used to generate backups by assigning asset components to separate backup threads. An asset may be assigned and divided to separate backup threads in any logical way. The division of asset components to separate threads allows for the files to be assigned to separate threads and not only folders. The execution of the backup threads results in the generation of pseudo-assets and the pseudo-assets are later merged together to generate a single asset backup stored in backup storages. The division of assets into separate backup threads allows for the parallelization of the asset backup operation and may improve the efficiency of generating backups of assets as opposed to generating asset backups in a sequential manner.

EXAMPLE

Figure 4A:
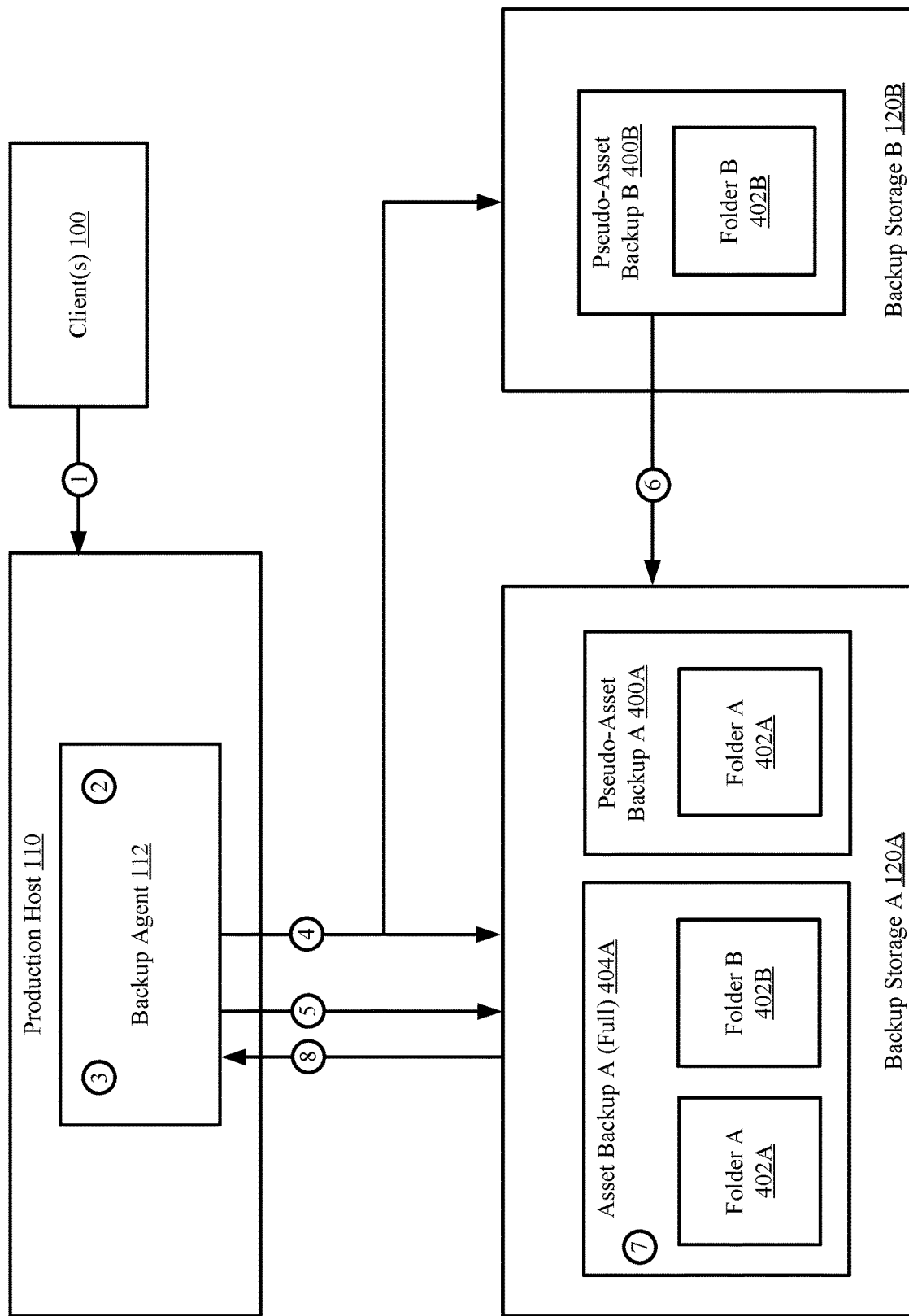
FIG. 4A shows a diagram of a first example in accordance with one or more embodiments of the invention.
Figure 4B:
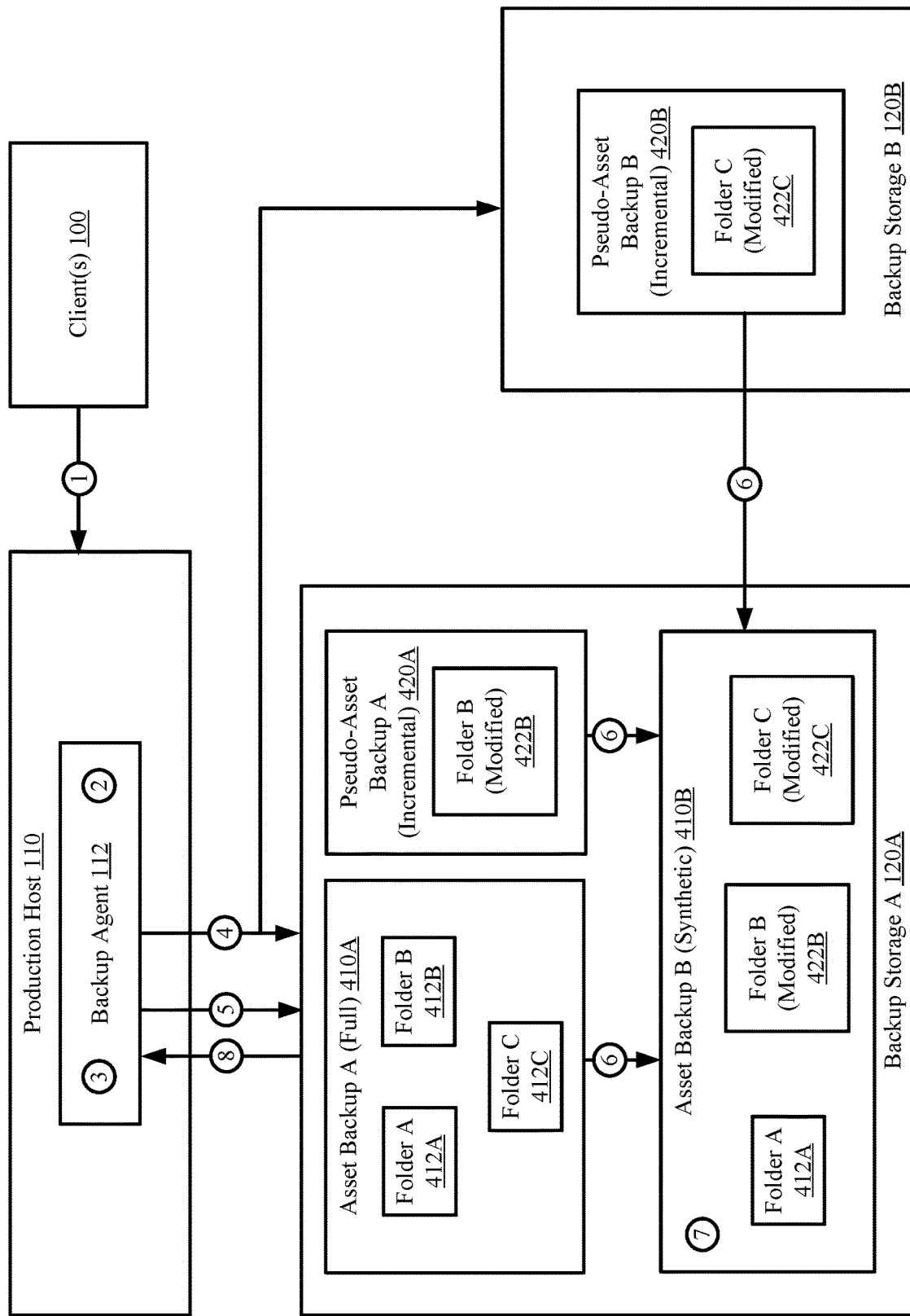
FIG. 4B shows a diagram of a second example in accordance with one or more embodiments of the invention.
Figure 4C:
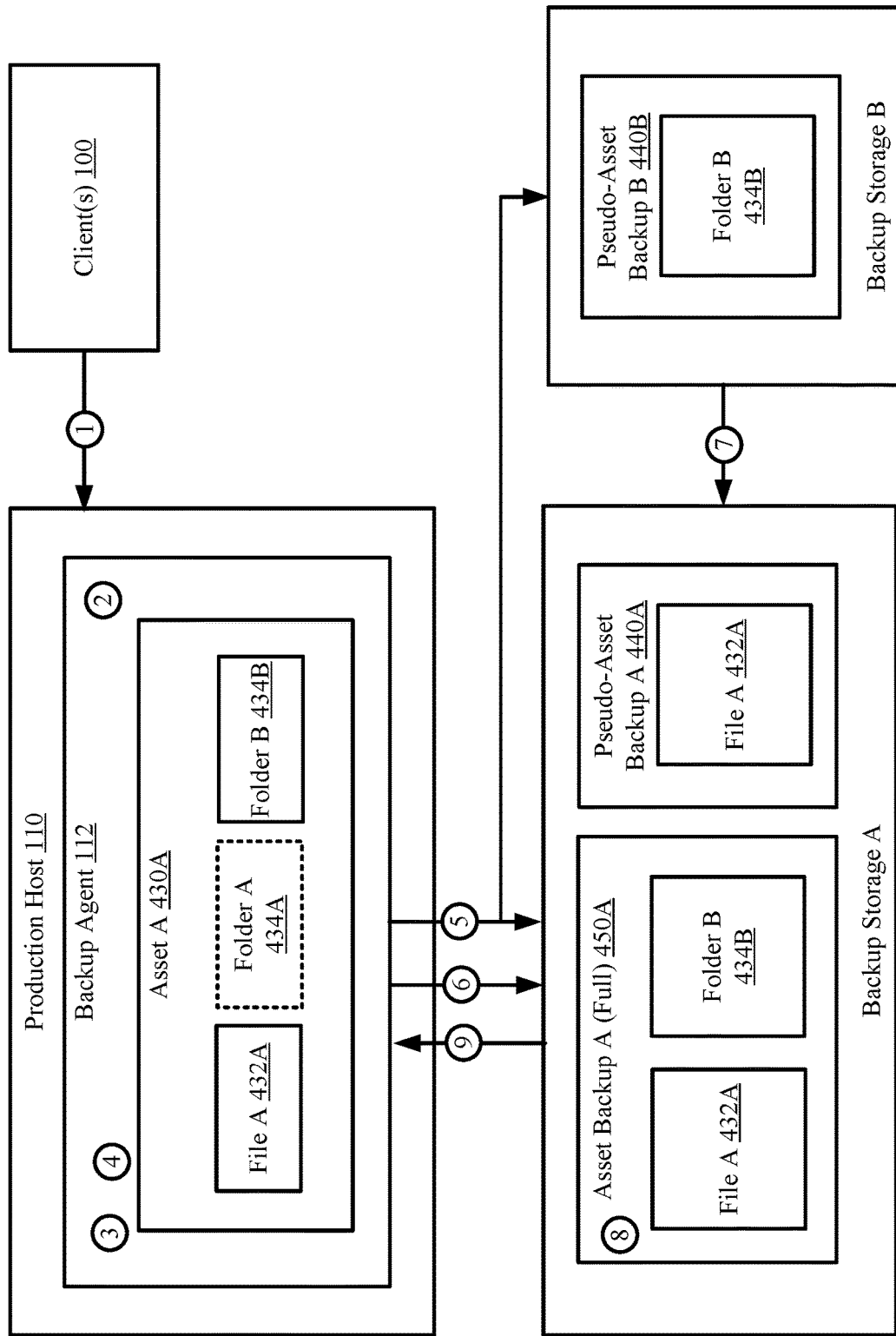
FIG. 4C shows a diagram of a third example in accordance with one or more embodiments of the invention.

The following section describes three examples. The examples are not intended to limit the invention. The examples are illustrated in FIGS. 4A-4C. Turning to the first example, consider a scenario in which an asset backup is generated using pseudo-assets and stored in backup storages.

FIG. 4A shows a diagram of a first example in accordance with one or more embodiments of the invention. A backup agent (112) of a production host (110) is generating an asset backup and storing the asset backup in backup storage A (120A) and backup storage B (120B) in response to a request to a request obtained from the client(s) (100). At a first point in time, the client(s) (100) sends a backup request to the production host (110) [1]. The backup request may specify the asset associated with the backup request. The backup agent (112) then obtains the asset and asset metadata associated with the backup request [2]. The asset includes two folders, folder A (402A) and folder B (402B). The backup agent (112) then divides the asset into two pseudo-assets, the first pseudo-asset includes folder A (402A) and the second pseudo-asset includes folder B (402B) based on the asset metadata [3].

The backup agent (112) then sends the first pseudo-asset to backup storage A (120A) where the first pseudo-asset is stored as pseudo-asset backup A (400A), and sends the second pseudo-asset to backup storage B (120B) where second pseudo-asset is stored as pseudo-asset backup B (400B) [4]. The backup agent (112) then sends a request to the backup storages (120A, 120B) to merge the pseudo-asset backups (400A, 400B) [5]. In response to the request, backup storage B (120B) send pseudo-asset backup B (400B) to backup storage A (120A) [6]. After obtaining pseudo-asset backup B (400B), backup storage A (120A) merges pseudo-asset backup A (400A) with pseudo-asset backup B (400B) to generate asset backup A (404A) [7]. Asset backup A (404A) is a full asset backup and includes both folder A (402A) and folder B (402B) of the asset. Backup storage A (120A) then updates asset backup metadata based on asset backup A (404A) and sends confirmation to the backup agent (112) that asset backup A (404A) has been generated [8].

Turning to the second example, consider a scenario in which a synthetic full asset backup is generated from an incremental asset backup using pseudo-assets. FIG. 4B shows a diagram of a second example in accordance with one or more embodiments of the invention. A backup agent (112) of a production host (110) is generating an synthetic full asset backup and storing the synthetic full asset backup in backup storage A (120A) and backup storage B (120B) in response to a request to a request obtained from the client(s) (100). At a first point in time, the client(s) (100) sends an incremental backup request to the production host (110) [1]. The incremental backup request may specify the asset associated with the incremental backup request. The backup agent (112) then obtains the asset and asset metadata associated with the backup request [2]. The asset includes three folders, folder A (412A), folder B (412B), and folder C (412C). The backup agent (112) then divides the asset into two pseudo-assets, the first pseudo-asset includes folder B (412B) and the second pseudo-asset includes folder C (402C) based on the asset metadata [3]. Folder B (412B) and folder C (412C) were modified since the generation of the previous asset backup associated with the asset, asset backup A (410A). Asset backup A (410A) is a full asset backup.

The backup agent (112) then sends the first pseudo-asset to backup storage A (120A) where the first pseudo-asset is stored as pseudo-asset backup A (420A), and sends the second pseudo-asset to backup storage B (120B) where second pseudo-asset is stored as pseudo-asset backup B (420B) [4]. Pseudo-asset backup A (420A) and pseudo-asset backup B (420B) are incremental pseudo-asset backups. The backup agent (112) then sends a request to the backup storages (120A, 120B) to merge the pseudo-asset backups (420A, 420B) with the previously generated asset backup (asset backup A (410A)) to generate a synthetic full asset backup [5]. In response to the request, backup storage B (120B) sends pseudo-asset backup B (420B) to backup storage A (120A). Backup storage A (120A) then merges pseudo backup A (420A) and pseudo backup B (420B) to generate an incremental asset backup (not shown). After that, backup storage a merges the incremental asset backup with asset backup A (410A) to generate asset backup B (410B) [6]. Asset backup B (410B) is a synthetic full asset backup that includes folder A (412A), and modified folder B (412B) and modified folder C (412C). Backup storage A (120A) then updates asset backup metadata based on asset backup B (410B) [7]. Finally, Backup storage A (120A) sends confirmation to the backup agent (112) that asset backup B (410B) has been generated [8].

Turning to the third example, consider a scenario in which a asset backup is generated from multiple backup threads. FIG. 4C shows a diagram of a third example in accordance with one or more embodiments of the invention. A backup agent (112) of a production host (110) is generating an asset backup using multiple backup threads and storing the asset backup in backup storage A (120A) and backup storage B (120B) in response to a request obtained from the client(s) (100).

At a first point in time, the client(s) (100) sends a backup request to the production host (110) [1]. The backup request may specify the asset associated with the backup request. The backup agent (112) then obtains the asset and asset metadata associated with the backup request [2]. The asset includes two folders, folder A (402A) and folder B (402B). The backup agent (112) then identifies the asset components using the asset entry of the asset metadata associated with the asset specified in the backup request [3]. The asset includes file A (432A), folder A (434A), and folder B (434B). After identifying the asset components, the backup agent assigns the asset components to two backup threads based on the asset metadata included in the asset entry [4].

The first backup thread includes file A (432A) and the second backup thread includes folder B (434B). Folder A (434A) was not included in a backup thread because the asset entry included an exclusion tag associated with folder A (434A). The backup agent (112) then executes the backup threads to generate pseudo-assets and sends the pseudo-assets to the backup storages where they are stored as pseudo-asset backups [5]. Backup storage A (120A) stores pseudo-asset backup A (440A) and backup storage B (120B) stores pseudo-asset backup B (440B). After the pseudo-asset backups (440A, 440B) are stored in the backup storages (120A, 120B), the backup agent (112) sends a request to backup storage A (120A) to merge the pseudo-asset backups (440A, 440B) to generate an asset backup [6].

In response to the request, backup storage B (120B) send pseudo-asset backup B (440B) to backup storage A (120A)

[7]. After obtaining pseudo-asset backup B (440B), backup storage A (120A) merges pseudo-asset backup A (440A) with pseudo-asset backup B (440B) to generate asset backup A (450A) [8]. Asset backup A (404A) is a full asset backup and includes both file A (432A) and folder B (434B) of the asset. Backup storage A (120A) then updates asset backup metadata based on asset backup A (450A) and sends confirmation to the backup agent (112) that asset backup A (450A) has been generated [9].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating asset backups by assigning asset components to separate backup threads of a backup operation. Further, in various embodiments of the invention, asset components are assigned to separate backup threads. Asset components of an asset may be assigned and divided to separate backup threads in any logical way. The division of asset components to separate threads allows for the files to be assigned to separate threads and not only folders. The execution of the backup threads results in the generation of pseudo-assets and the pseudo-assets are later merged together to generate a single asset backup stored in backup storages. The division of assets into separate backup threads allows for the parallelization of the asset backup operation and may improve the efficiency of generating backups of assets as opposed to generating asset backups in a sequential manner.

In traditional systems, the asset backups may be performed sequentially. This may take up unnecessary computational resources of the backup storage and/or the production host. An asset may be divided in any logical way and assigned to separate threads each executed to generate pseudo-assets. The pseudo-assets are later merged together to generate a single asset backup. The division of assets into pseudo-assets allows for the parallelization of the asset backup operation as discussed above. Embodiments of the invention improve the efficiency of generating backups of assets using pseudo-assets as opposed to generating asset backups in a sequential manner.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for backing up data, the method comprising:
obtaining a backup request; and
in response to the backup request:
obtaining an asset and an asset entry from a file system metadata repository associated with the backup request;
identifying asset components of the asset using the asset entry, wherein the asset entry indicates a logical division of the asset components based on an asset structure, asset component sizes, and one or more exclusion tags associated with the asset specified by the asset entry;
dividing the asset components into a first portion of the asset components and a second portion of the asset components based on the logical division of the asset components, wherein the logical division of the asset components specifies an even distribution of asset component sizes between the first portion of the asset components and the second portion of the asset components;
assigning the first portion of the asset components to a first backup thread and the second portion of the asset components to a second backup thread to be backed up as pseudo-assets based on the logical division of the asset components, wherein:
the first portion of the asset components comprises a first portion of files and folders of the asset, and the second portion of the asset components comprises a second portion of files and folders of the asset;

executing the first backup thread and the second backup thread to generate a first pseudo-asset backup and a second pseudo-asset backup, wherein the first backup thread is executed in parallel with the second backup thread, wherein an even distribution of computing resources is used to execute the first backup thread and the second backup thread;

storing the first pseudo-asset backup and the second pseudo-asset backup on backup storages;

updating asset backup metadata based on the first pseudo-asset backup and the second pseudo-asset backup; and initiating merging of the first pseudo-asset backup and the second pseudo-asset backup on the backup storages using the asset backup metadata to generate an asset backup.

2. The method of claim 1, wherein the asset backup comprises the asset components and the asset entry associated with the asset.

3. The method of claim 1 wherein the exclusion tags specify asset components to be excluded from being backed up using the first backup thread and the second backup thread.

4. The method of claim 1, wherein:
the first pseudo-asset backup comprises:
a first portion of asset data of the asset corresponding to the first portion of the asset components; and
a first portion of the asset entry corresponding to the first portion of the asset data; and
the second pseudo-asset backup comprises:
a second portion of asset data of the asset corresponding to the second portion of the asset components; and
a second portion of the asset entry corresponding to the second portion of the asset data.

5. A system for backing up data, comprising:
a processor;
a backup agent, which when executed by the processor performs a method, the method comprising:
identifying asset components of the asset using the asset entry, wherein the asset entry indicates a logical division of the asset components based on an asset structure, asset component sizes, and one or more exclusion tags associated with the asset specified by the asset entry;
dividing the asset components into a first portion of the asset components and a second portion of the asset components based on the logical division of the asset components, wherein the logical division of the asset components specifies an even distribution of asset component sizes between the first portion of the asset components and the second portion of the asset components;
assigning the first portion of the asset components to a first backup thread and the second portion of the asset components to a second backup thread to be backed up as pseudo-assets based on the logical division of the asset components, wherein:
the first portion of the asset components comprises a first portion of files and folders of the asset, and
the second portion of the asset components comprises a second portion of files and folders of the asset;

executing the first backup thread and the second backup thread to generate a first pseudo-asset backup and a second pseudo-asset backup, wherein the first backup thread is executed in parallel with the second backup thread, wherein an even distribution of computing resources is used to execute the first backup thread and the second backup thread;

storing the first pseudo-asset backup and the second pseudo-asset backup on backup storages;

updating asset backup metadata based on the first pseudo-asset backup and the second pseudo-asset backup; and initiating merging of the first pseudo-asset backup and the second pseudo-asset backup on the backup storages using the asset backup metadata to generate an asset backup.

6. The system of claim 5, wherein the asset backup comprises the asset components and the asset entry associated with the asset.

7. The system of claim 5, wherein the exclusion tags specify asset components to be excluded from being backed up using the first backup thread and the second backup thread.

8. The system of claim 5, wherein:
the first pseudo-asset backup comprises:
a first portion of asset data of the asset corresponding to the first portion of the asset components; and
a first portion of the asset entry corresponding to the first portion of the asset data and
the second pseudo-asset backup comprises:
a second portion of asset data of the asset corresponding to the second portion of the asset components; and
a second portion of the asset entry corresponding to the second portion of the asset data.

9. A non-transitory computer readable medium comprising computer readable program code, which when executed by a computer processor enables the computer processor to perform a method for backing up data, the method comprising:
obtaining a backup request; and
in response to the backup request:
obtaining an asset and an asset entry from a file system metadata repository associated with the backup request;
identifying asset components of the asset using the asset entry, wherein the asset entry indicates a logical division of the asset components based on an asset structure, asset component sizes, and one or more exclusion tags associated with the asset specified by the asset entry;
dividing the asset components into a first portion of the asset components and a second portion of the asset components based on the logical division of the asset components, wherein the logical division of the asset components specifies an even distribution of asset component sizes between the first portion of the asset components and the second portion of the asset components;
assigning the first portion of the asset components to a first backup thread and the second portion of the asset components to a second backup thread to be backed up as pseudo-assets based on the logical division of the asset components, wherein:
the first portion of the asset components comprises a first portion of files and folders of the asset, and the second portion of the asset components comprises a second portion of files and folders of the asset;

executing the first backup thread and the second backup thread to generate a first pseudo-asset backup and a second pseudo-asset backup, wherein the first backup thread is executed in parallel with the second backup thread, wherein an even distribution of computing resources is used to execute the first backup thread and the second backup thread;

storing the first pseudo-asset backup and the second pseudo-asset backup on backup storages;

updating asset backup metadata based on the first pseudo-asset backup and the second pseudo-asset backup; and initiating merging of the first pseudo-asset backup and the second pseudo-asset backup on the backup storages using the asset backup metadata to generate an asset backup.

10. The non-transitory computer readable medium of claim 9, wherein the asset backup comprises the asset components and the asset entry associated with the asset.

11. The non-transitory computer readable medium of claim 9, wherein the exclusion tags specify asset components to be excluded from being backed up using the first backup thread and the second backup thread.

* * * * *